J. F. BOYNTON.

Carbureter.

No. 2,375.

Reissued Oct. 16, 1866.

Witnesses:

Almon C. Murray
Lyman S. Evans

Inventor:

John F. Boynton

AM. PHOTO-LITHO. CO. N.Y. (OSBORNE'S PROCESS.)

UNITED STATES PATENT OFFICE.

JOHN F. BOYNTON, OF SYRACUSE, NEW YORK.

IMPROVEMENT IN APPARATUS FOR CARBURETING GAS.

Specification forming part of Letters Patent No. 49,705, dated September 5, 1865; Reissue No. 2,375, dated October 16, 1866.

*To all whom it may concern:*

Be it known that I, JOHN F. BOYNTON, of Syracuse, in the county of Onondaga and State of New York, have invented a new and useful improvement in that class of apparatus which relates to the increase of the illuminating power of gas, such as is used for lighting cities and dwellings; and I do hereby declare that the following is a full, clear, and exact description thereof, reference being had to the accompanying drawings, and to the letters of reference marked thereon.

It is well known that illuminating-gas is liable to become partially decomposed in passing any considerable distance through cold tubes, and also that ordinary city gas does not hold as much illuminating property as it is susceptible of containing and as can by certain means be easily imparted to it. The carbon which communicates its illuminating property becomes deposited, and the gas will thereby become greatly deteriorated.

Many contrivances have been devised for remedying this defect, but the most successful of these consist in an apparatus for thoroughly commingling the defective gas with vapor containing a superabundance of the desired ingredient.

To enable others skilled in the art to make and use my invention, I will now proceed to describe the construction and operation of my apparatus, which I have named a "gas-light multiplier."

The object of my invention is to cause a rapid evaporation of a liquid hydrocarbon in a box or vessel through which the gas passes before reaching the burners, and the mixing of the vapors produced by such evaporation with the gas to supply it with carbon and increase its illuminating power. It is manifest that the evaporation which takes place in said box or vessel will be in proportion to the surface of liquid hydrocarbon exposed within it.

In my apparatus I increase the surface of the liquid exposed to evaporation by drawing it up and diffusing it through the box or vessel by means of capillary attraction.

Heretofore fibrous materials, such as cotton-wicking and cloth, have been used as capillary agents for this purpose; but I have found that soft porous wood can be used with great advantage, especially in combination with cotton-wicking or other fibrous material, which it serves to support, while at the same time it actively assists in carrying on the capillary action.

Figure 1:
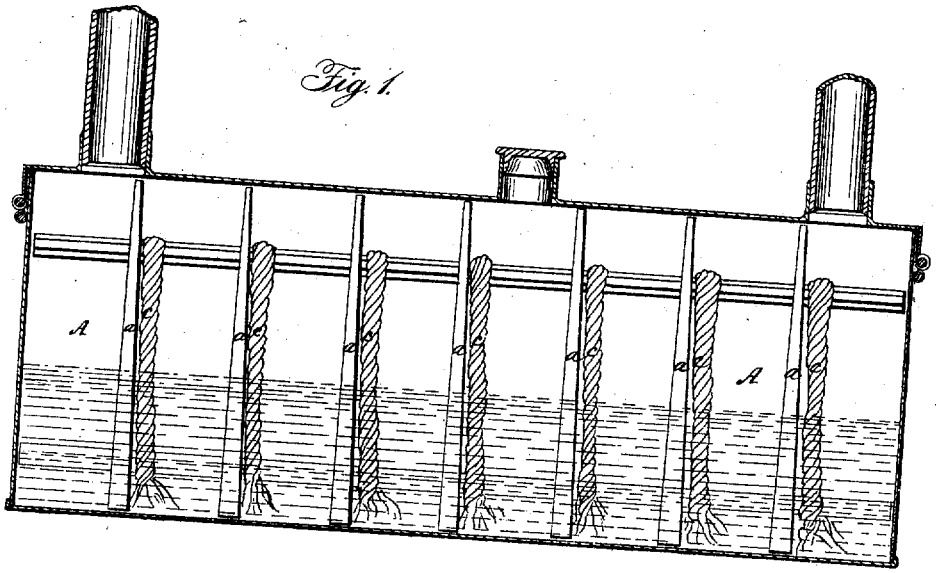
Figure 2:
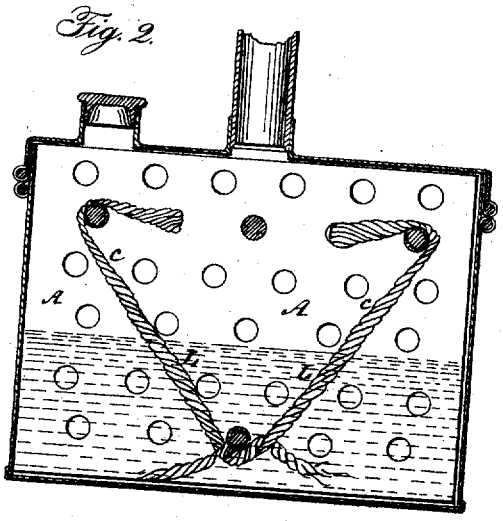

In the accompanying drawings, Figure 1 represents a longitudinal section of the multiplier, and Fig. 2 a cross-section of the same.

A A is a box or receiver, of any convenient size and form for holding the liquid hydrocarbons, and in which they are evaporated and mixed with the gas. I prefer to make this box of cast-iron, with its length at least double its breadth or height. I make several partitions, *a a*, in this box, which are formed of wood, and are made tapering in shape, having their thick edges downward. These partitions should extend from near the bottom of the box, or at least from some point below the surface of the liquid which is to be contained therein, to near the top of the box. They are to be perforated with numerous holes, which should be distributed over their whole surface. For these partitions I prefer wood with a straight grain, and they should be so formed that the grain will run vertically and in the position in which the wood grew.

Through some of the apertures in the partitions I insert bars *b b*, to hold the partitions in place and to support the wicking or fibrous material *c c*, which is intertwined through the other apertures, and which should be brought down beneath the surface of the liquid in the box. All the other apertures may be used in like manner to sustain the wicking in the way shown in the drawings.

It will be observed that as the pores of the wood stand upright, in the position of their natural growth, the fluid will pass up the capillary vessels to the top of the partitions through the central capillary tubes; but as the partitions are much thicker at the base than at the top, the capillary vessels will be constantly presenting their openings along the sides of the partitions, and as the surface of the liquid descends the number of these capillary tubes brought into action will increase, as will also the number in the cotton-wicking employed. The capillary action of these wicks is so great that the fluid will be drawn up faster than it will pass off by evaporation, and the external surface of these wooden partitions and supports will therefore be kept constantly moistened, thus aiding greatly to produce the evaporation which is desired.

When the vessel is first sufficiently filled with the hydrocarbon liquid the lighter portions will first evaporate. These will pass off more freely than the heavier portions, which will remain in the vessel after the lighter have passed off; but as the surface of the liquid descends, and the liquid itself becomes less volatile, the number of capillary pores brought into action will be all the while increasing, and thus a uniform or nearly uniform supply of the vapors to mix with and enrich the gas will be constantly maintained.

While I prefer, in using wood as a capillary agent, to apply it in the form above described, I do not limit myself to its use in that precise form; but

What I claim as new, and desire to secure by Letters Patent, is—

1. In an apparatus for carbureting gas by charging it with the vapors of hydrocarbon liquids, the use of wood as a capillary agent to draw up the liquid and expose it to evaporation.

2. In a carbureting apparatus, as above described, the use of wood, in combination with cotton-wicking or other fibrous material, to produce the capillary action necessary to promote rapid evaporation, substantially as described.

3. So arranging and constructing the cotton-wicking or other fibrous material and its wooden supports that, as the surface of the liquid in the carbureting-vessel descends, the number of capillary pores brought into action will be all the while increasing, substantially as described.

4. A combination of wood and wicking, or other fibrous material, so arranged as to form a movable frame or cage, setting into a box, and producing a compound capillary action of porous and fibrous material, substantially as described.

JOHN F. BOYNTON.

Witnesses:
J. J. COOMBS,
JOS. L. COOMBS.